Patented May 8, 1923.

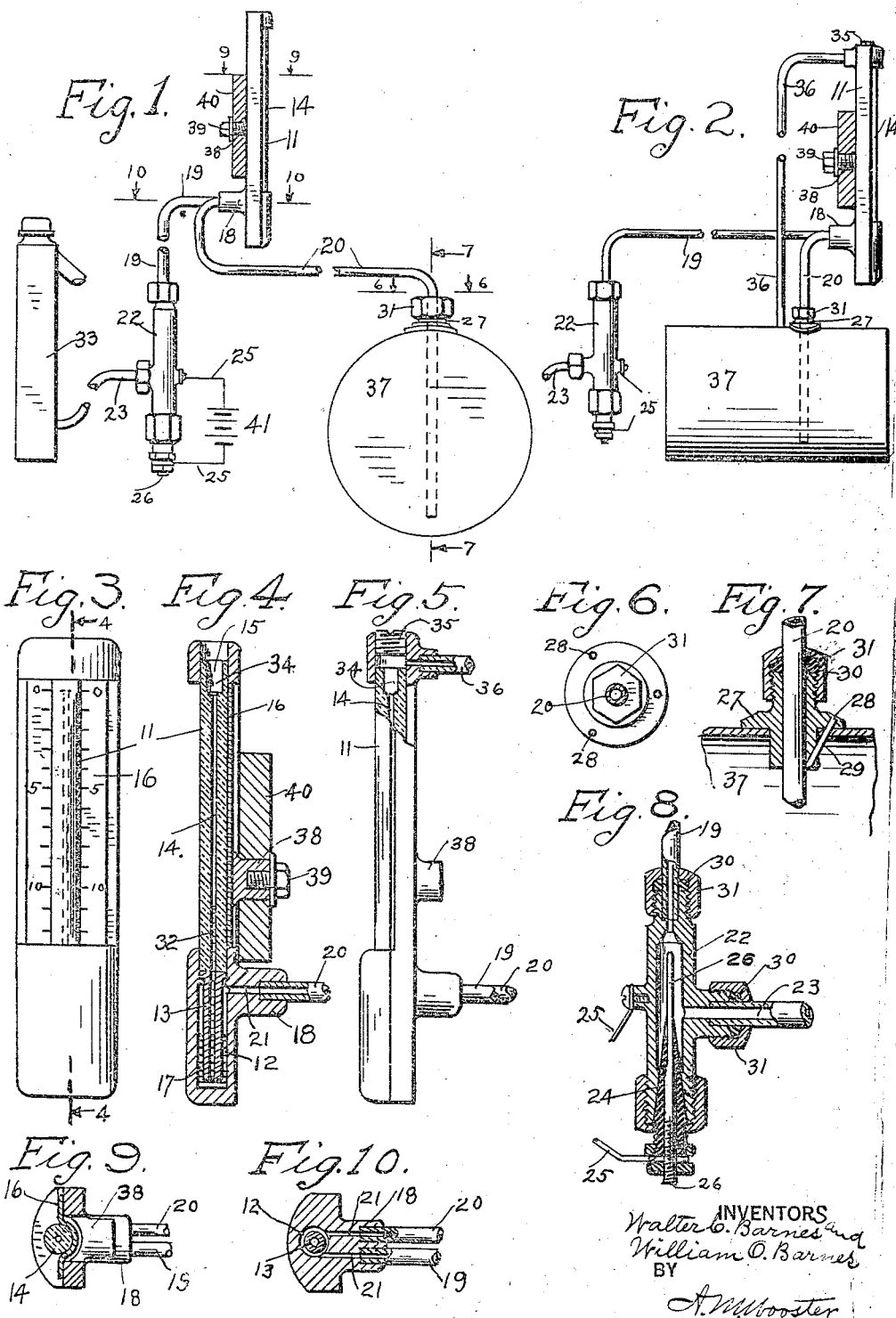

1,454,531

UNITED STATES PATENT OFFICE.

WALTER C. BARNES, OF CHICAGO, ILLINOIS, AND WILLIAM O. BARNES, OF LEOMINSTER, MASSACHUSETTS.

INSTRUMENT FOR MEASURING THE HEIGHT OF LIQUIDS.

Application filed June 10, 1921. Serial No. 476,446.

*To all whom it may concern:*

Be it known that we, (1) WALTER C. BARNES and (2) WILLIAM O. BARNES, citizens of the United States, residing at (1) Chicago, (2) Leominster, county of (1) Cook, (2) Worcester, State of (1) Illinois, (2) Massachusetts, have invented an Improvement in Instruments for Measuring the Height of Liquids, of which the following is a specification.

Our invention relates to indicators for measuring the height of a liquid in a container especially when the indicator is to be located at a distance, and has been shown in the drawing as applied for the measurement of the height of the liquid in the fuel tank of an automobile. The object of this invention is to provide a simple and inexpensive device of the above class which shall accurately indicate the height of the liquid in a tank when the indicator is at a distance from the tank without the use of floats, levers, or other unreliable moving mechanisms.

To these and other ends our invention consists in certain arrangements and combination of parts as will be pointed out with greater particularity in the appended claims.

Referring to the drawings:

Fig. 1 is a conventional representation of the outlay of our apparatus;

Fig. 2 shows a modified form of apparatus in which an equalizing pipe 36 is provided;

Fig. 3, one form of indicator;

Fig. 4, a side view in cross-section of the indicator of Fig. 3;

Fig. 5, a modified form of indicator adapted to be used with the apparatus of Fig. 2;

Fig. 6, a plan view of the connection shown in Fig. 7;

Fig. 7, a section through the bushing around the pipe 20 where the same enters the fuel tank;

Fig. 8, a cross-section of our electrolytic cell;

Fig. 9, a section on the line 9—9 of Fig. 1; and

Fig. 10 shows a section on the line 10—10 of Fig. 1.

For purposes of illustration we have shown our invention applied to the measurement of the fuel of the automobile with the indicator on the dash or other convenient location. Because depending upon the differential fluid pressure gauge principle we have been able to produce such an indicator suitable for a wide application and having great accuracy, this for the reason that we do away with the presence of mechanically moving parts such, for example, as the levers, rotatable shafts, floats, etc., found in many liquid level indicators.

Referring to the drawing, the numeral 11 shows our gauge in the lower portion of which is located the well 12, and extending down into the well but supported by its shouldered top portion is the tube 13 whose central passageway is in alinement with that of the gauge glass 14. In the modification shown by Figures 1, 3 and 4 the top of the gauge glass is exposed to the atmosphere at 15. A graduated plate 16 of metal or other suitable material is affixed beside the gauge glass and may be graduated to show the volume of liquid in the tank above a predetermined level; or as shown in Figure 3 with the zero at the top of the gauge may indicate the volume of liquid already used up, or in other words the volume required to fill the tank. Disposed in the well 12 may be some liquid 17, such, for example, as mercury, which is adapted to rise in the bore of the gauge 14 upon the application of greater than atmospheric pressure to the top of the liquid in the well 12. If small increments of pressure are to be indicated, it may be desirable to have a liquid of less density, as for example, an oil in place of the mercury in order that greater differences in level may be obtained. Or it may be desirable to use mercury in the well 12 with an oil in the bore 14. A lug 18 projecting from the rear of the gauge is provided therein with two small passageways 21 connecting with the well space above the level of the mercury and connected at their other ends with the small tubes or conduits 19 and 20. From Fig. 1 it will be seen that the tube 20 leads down through the top of the fuel tank 37 to a position adjacent the bottom thereof. The bottom of the pipe 20 in the fuel tank is the predetermined level above which the height of liquid is to be measured. The other pipe 19 leads to some suitable source of gas pressure for the gauge, preferably from the electrolytic cell shown in Fig. 8, as comprising the body portion 22 whose lower end contains the insulating bushing 24, in which is located the electrode 26. The conducting leads 25 may be connected with an electric battery 41 or other suitable source of current for the electrolysis of water within the cell 22. The cell 22 may be coupled through the passageway 23 with some appropriate source of water supply, such as the water cooling system of the automobile or the radiator 33. The water pressure in our electrolytic cell should preferably be under greater pressure at all times than the maximum pressure at the bottom of the pipe 20, in order that the cell may act as a water seal to prevent the escape of the gas through the passageway 23. By having the bubbles of gas form slowly around the electrode 26, they may be caused to rise and pass through the tube 19 into contact with the liquid in the well 12 of the gauge. Care should be taken that the passageway 19 be of small diameter and free from any pockets in which the small bubbles of gas may coalesce. Both the conduits 19 and 23 may be secured to the body portion of the cell 22 by means of some usual form of packing 30 and nuts 31.

Where the pipe 20 leads into the fuel tank 37 some appropriate form of bushing 27 may be used, such for example, as that shown in the drawing, provided with a plurality of holes 28 in the base thereof through which pins 29 may be used to secure the bushing to the container. The pipe 20 is preferably freely movable through the bushing 27, but is adapted to be clamped at its adjusted height by screwing the nut 31 to compress the packing 30 contained at the top of the bushing.

In operation the slow and gradual decomposition of water in the electrolytic cell 22 produces bubbles of gas which rise and cause an increase of pressure in the well 12. The increase of pressure on the liquid in the well causes the level of the liquid in the gauge to indicate the degree of this pressure. With the tube 20 arranged as indicated, the pressure on the well 12 is always kept the same as the pressure at the predetermined level due to the head of liquid thereon, because any excess pressure on the well 12 causes the gas to escape out from the bottom of the tube 20 and up through the liquid. In order that our apparatus may be economical in operation stress may be laid upon the necessity for having the tubes 19, 20 and 21 of small diameter and in actual practice to show what little quantity of gas may be required to be produced by the electrolytic cell, it may be stated that the volumetric capacity of these tubes and the gauge is so small that one cubic inch of gas per hour has been found sufficient to keep up pressure in the gauge to the amount necessary to give it the required sensitiveness.

Figs. 1, 3 and 4 indicate the type of apparatus to be used when the top of the liquid level to be measured is exposed to the atmosphere, but when the surface of the liquid to be measured is subjected to a greater or less pressure, it may be desirable to use an equalizing pipe 36 connecting the top of the gauge, which as shown in Fig. 5 has been closed by the plug 35, with the pressure on the surface of the liquid in the container 37. The gauge 11 may also be provided with a lug 38 whereby the same may be conveniently attached to the dash 40 by means of the bolt 39. As shown in Fig. 4, the body portion of the bore of the gauge glass is of enlarged diameter as far down as the zero mark. Such an arrangement affords an easy means of insuring the correct amount of liquid in the gauge because when the tank 37 is filled and the electrolytic cell in operation, the liquid level in the gauge glass should be opposite the zero mark. If under these conditions less than the required amount of liquid is present, the enlarged bore 34 affords an easy means for filling the gauge glass and in case an excess of liquid is supplied, this enlarged bore affords a convenient means for the removal of this excess by means of a pipette or wad of absorbent material inserted into the bore 34.

When the liquid to be measured is of such a character that it yields a gaseous product when subjected to electrolysis, it is possible to dispense with the tube 19 and connect the electrolytic cell directly to the liquid whose level is to be measured.

Among the advantages of our invention may be enumerated the freedom from mechanically moving parts and the adaptability of our gauge to be used at a distance from the location of the liquid level to be indicated. Having the passageways 19, 20 and 21 of such small diameter our electrolytic cell affords a convenient and economical source of gas pressure for the gauge inasmuch as a very small fraction of an ampere is sufficient to produce the necessary electrolysis. When the electrolytic cell 22 is under a greater head than the maximum at the predetermined level in the fuel tank, the cell is always sealed by water and the only outlet for the excess gas is through the tube 20 and liquid in the container 37 by means of which the pressure on the gauge is constantly kept the same as that pressure in the container 37 at the predetermined level, regardless of the head or height of liquid above this predetermined level.

We claim:

1. In an indicator for liquid level in a container, the combination with a fluid pressure gauge, of an electrolytic cell for decomposing liquid therein by electrolysis, a conduit connecting the cell with the gauge for continuously supplying a fluid pressure thereto, a liquid container, and an outlet conduit connecting said first mentioned conduit with the liquid container below the normal liquid level therein.

2. In an indicator for liquid level in a container, the combination of a differential fluid pressure gauge, of an electrolytic cell for decomposing liquid therein by electrolysis, a conduit connecting the cell with the high pressure side of the gauge, a liquid container, a conduit connecting the gauge and the first mentioned conduit with the container below the normal liquid level therein, and means for equalizing the pressures on the surface of the liquid in the container and the low pressure side of the gauge.

3. In an indicator for liquid level in the fuel tank of a motor vehicle having a dash board and a source of electric current, the combination with a fluid pressure gauge mounted on said dashboard, of an electrolytic cell for decomposing liquid therein by electrolysis and connected with said source of current supply, a conduit connecting the cell with the gauge, a fuel tank, and an outlet conduit connecting said first mentioned conduit with the fuel tank below the normal fuel level therein.

4. In an indicator for fuel level in the tank of an automobile, the combination with a differential fluid pressure gauge, of a passageway connected with the water cooling system and adapted to be under uniformly greater pressure than that in any part of the fuel tank, an electrolytic cell in said passageway for slowly decomposing a portion of the water therein, a conduit connecting the gauge with the cell, a fuel tank, an outlet conduit joining the gauge and the first mentioned conduit with the fuel tank below the normal fuel level, and means for maintaining the same pressure on the surface of the fuel in the tank as on the low pressure side of the gauge.

5. In an indicator for fuel level in the tank of an automobile having a water cooling system, the combination with a fluid pressure gauge, of an electrolytic cell for decomposing water therein by electrolysis, means connecting the water cooling system with the cell to supply water to the latter, a conduit connecting the gauge with the cell, a fuel tank, and an outlet conduit connecting said first mentioned conduit with the fuel tank below the normal fuel level therein.

6. In an indicator for liquid level in a container, the combination with a fluid pressure gauge, of an electrolytic cell for decomposing liquid therein by electrolysis, a source of liquid supply connected with said cell to supply liquid thereto, a conduit connecting the cell with the gauge for continuously supplying a fluid pressure thereto, a liquid container, and an outlet conduit connecting said first mentioned conduit with the liquid container below the normal liquid level therein.

In testimony whereof we affix our signatures.

WALTER C. BARNES.
WILLIAM O. BARNES.